US008472025B2

(12) United States Patent
Reinhard et al.

(10) Patent No.: US 8,472,025 B2
(45) Date of Patent: Jun. 25, 2013

(54) DEVICE AND METHOD FOR DETECTING REFLECTED AND/OR EMITTED LIGHT OF AN OBJECT

(75) Inventors: Christoph Reinhard, Utzenstorf (CH); Reto Schletti, Burgdorf (CH)

(73) Assignee: BEB Industrie-Elektronik AG (CH)

( * ) Notice: Subject to any disclaimer, the term of this patent is extended or adjusted under 35 U.S.C. 154(b) by 0 days.

(21) Appl. No.: 13/144,072

(22) PCT Filed: Dec. 4, 2009

(86) PCT No.: PCT/EP2009/008688
§ 371 (c)(1), (2), (4) Date: Jul. 14, 2011

(87) PCT Pub. No.: WO2010/081507
PCT Pub. Date: Jul. 22, 2010

(65) Prior Publication Data
US 2011/0273717 A1 Nov. 10, 2011

(30) Foreign Application Priority Data
Jan. 15, 2009 (DE) ........................ 10 2009 005 171

(51) Int. Cl.
*G01N 21/55* (2006.01)

(52) U.S. Cl.
USPC .......................................... 356/445; 356/447

(58) Field of Classification Search
USPC .................... 356/445–448; 250/458.1, 459.1
See application file for complete search history.

(56) References Cited

U.S. PATENT DOCUMENTS 4,271,699 A 6/1981 Williamson
4,729,556 A 3/1988 Fujii et al.
4,836,528 A 6/1989 Geiser
5,226,239 A 7/1993 Boissevain et al.
5,727,692 A 3/1998 Large et al.
6,360,447 B1 3/2002 Foley
6,711,828 B2 3/2004 McCune et al.
6,782,986 B2 8/2004 Toda et al.
6,918,482 B2 7/2005 Thierauf (Continued)

FOREIGN PATENT DOCUMENTS

DE 1774345 A1 1/1972
DE 19841432 C1 4/2000

(Continued)

OTHER PUBLICATIONS

English translation of the International Preliminary Report on Patentability for PCT/EP2009/008688, issued Jul. 19, 2011.

(Continued)

*Primary Examiner* — Tri T Ton
(74) *Attorney, Agent, or Firm* — Harness, Dickey & Pierce, P.L.C.

(57) ABSTRACT

A device and a method for detecting reflected and/or emitted light of an object (1) are proposed having at least one illumination device (2) illuminating the object (1) with pulsed light, and having at least one sensor (4, 6) capturing the light reflected and/or emitted by the object (1), and having a transport device transporting the object relative to the illumination device (2) and past the sensor 4, 6) in the direction of transport, and having a power supply (16, 17, 18, 19, 20, 21, 22) for the illumination device (2) providing the illumination device (2) with a current that is a periodic function over time, wherein a period comprises at least two current pulses (23, 24) of different magnitudes.

10 Claims, 3 Drawing Sheets

U.S. PATENT DOCUMENTS

| | | | |
|---|---|---|---|
| 7,131,211 | B2 | 11/2006 | Kirstine |
| 7,392,743 | B2 | 7/2008 | Kawaguchi et al. |
| 7,743,523 | B2 | 6/2010 | Schletti et al. |
| 2002/0110396 | A1 | 8/2002 | Ueoka |
| 2003/0141653 | A1 | 7/2003 | Kumamoto et al. |
| 2004/0211904 | A1 | 10/2004 | Scowen et al. |
| 2007/0057198 | A1 | 3/2007 | Wilson et al. |
| 2008/0189968 | A1 | 8/2008 | Schletti et al. |
| 2009/0001661 | A1 | 1/2009 | Klein et al. |

FOREIGN PATENT DOCUMENTS

| | | | |
|---|---|---|---|
| EP | 0080309 | A2 | 6/1983 |
| EP | 0261354 | A1 | 3/1988 |
| EP | 0344967 | A1 | 12/1989 |
| EP | 1220165 | A2 | 7/2002 |
| EP | 1720135 | A1 | 11/2006 |
| GB | 2170908 | A | 8/1986 |
| GB | 2262614 | A | 6/1993 |
| GB | 2366371 | A | 3/2002 |
| GB | 2404013 | A | 1/2005 |
| JP | 05085643 | A | 4/1993 |
| WO | WO-92/11505 | A1 | 7/1992 |
| WO | WO-2006119926 | A1 | 11/2006 |

OTHER PUBLICATIONS

English translation of the International Preliminary Report on Patentability for PCT/EP2009/008833, issued Aug. 2, 2011 for related U.S. Appl. No. 13/144,063.

Chinese Office Action dated Mar. 4, 2013 for related application and its English translation.

DEVICE AND METHOD FOR DETECTING REFLECTED AND/OR EMITTED LIGHT OF AN OBJECT

CROSS-REFERENCE TO RELATED APPLICATIONS

This application is a National Stage of International Application No. PCT/EP2009/0008688, filed Dec. 4, 2009. This application claims the benefit and priority of German application 10 2009 005 171.5, filed Jan. 15, 2009. The entire disclosures of the above applications are incorporated herein by reference.

BACKGROUND

This section provides background information related to the present disclosure which is not necessarily prior art.

TECHNICAL FIELD

The invention relates to a device and a method for detecting reflected and/or emitted light of an object, in particular of a flat object.

DISCUSSION

Such devices are used to inspect objects. This includes, for example, recognizing, inspecting, verifying and testing whether objects are genuine and identifying counterfeits. Said objects include in particular vouchers or documents such as bank notes, checks, stocks, paper with a security imprint, deeds, admission tickets or travel tickets, coupons, but also credit or ATM cards, identification or access cards. Devices for detecting reflected and/or emitted light of an object are frequently an integral part of a system consisting of several components for handling and processing flat objects. Devices for detecting reflected and/or emitted light serve to distinguish counterfeit from genuine objects. In order to distinguish counterfeit from genuine objects, the objects, in particular bank notes, security or identification documents or documents of value, are printed with suitable security printing inks. Said inks convey a specific color impression to the viewer in the visible spectral range. In addition, when illuminated with light in the invisible spectral range, for example in the UV or IR range, they have a characteristic reflective, fluorescent or phosphorescent reaction. Since commercial and ordinary printing inks do not display this characteristic reaction, counterfeit objects can be distinguished from genuine objects by inspecting the reflection, fluorescence and phosphorescence of light through objects.

SUMMARY OF THE INVENTION

When inspecting the reflection, fluorescence and phosphorescence of an object, it proves problematic that the intensity of the light reflected or emitted is either so great that the detector being used for detection becomes saturated or the intensity is so weak that the detector cannot detect the effect. Since the objects to be inspected exhibit differences in their reflective, fluorescent and phosphorescent characteristics, the intensity of the reflected or emitted light cannot be adjusted to a predetermined value or restricted to a narrow range, and the detector or sensor cannot be adjusted to this range.

In contrast, the device has the advantage that it is equipped with a power supply for an illumination device that supplies the illumination device with a periodic current over time, wherein a period of the progression over time comprises at least two current pulses of different magnitudes. The variable strength of the current pulses from the power supply result in different intensities for the light pulses of the illumination device. As a result, each area of the object is illuminated by one strong and one weak light pulse. The frequency of the pulsed light and the resolution over time of a sensor that captures the light reflected from the object and/or emitted by fluorescence and phosphorescence is so high in comparison to the speed of the transport device that the movement of the object between two light pulses is negligible. It can therefore be assumed as an approximation that the object is at rest between being illuminated with one strong and one weak light pulse.

The sensor captures the light reflected and/or emitted from the object both with reference to the strong light pulse and with reference to the weak light pulse. If the sensor reaches saturation in the case of the strong light pulse, only the reflected and/or emitted light with respect to the weak light pulse is analyzed. If, on the other hand, the reflected and/or emitted light is too low in terms of intensity because of the weak light pulse, only the reflected and/or emitted light with respect to the strong light pulse is analyzed. The dynamic range of the measuring system is expanded in this manner. This makes quantified detection possible without knowing in advance the strength of the optical properties to be detected.

If the resolution based on two current pulses of different strength is too low, the number of different current pulses per period of the periodic current over time can be increased. The strengths of the current pulses and the duration in time of the pulses in relation to the duration of current strength 0, described as the duty cycle, can be specified depending on the objects to be examined. This applies in addition to the duration of the periods or the frequency of the periodic current, respectively.

Periodic current in terms of time means in this case that the current is a periodic function over time and thus has periodicity over time.

The method in accordance with the invention is distinguished by the fact that the illumination device illuminates the object using pulsed light, wherein at least two light pulses of different intensity are generated within one period of the pulsed light. Said intensity is achieved by the illumination device being provided with a pulsed current by means of a power supply, wherein each period comprises at least two current pulses with a different current strength.

In accordance with an advantageous embodiment of the invention, the illumination device has at least one light-emitting diode (LED). Electrically stimulated lamps such as fluorescent lamps and gas-discharge lamps can certainly be used in place of said light-emitting diode (LED), but light-emitting diodes (LED) stand out by comparison through their compact size, low manufacturing cost, faster response time and thus a higher frequency for the light pulses, and reduced susceptibility to malfunction and repair. In each case, illumination using monochromatic light, or at least light of a narrow spectral range, is of advantage. In this way it is more easily possible to distinguish the fluorescence and phosphorescence of genuine objects on the one hand and counterfeit objects on the other.

In accordance with a further advantageous embodiment of the invention, the light-emitting diode (LED) is a UV light-emitting diode UV-LED. UV light has the advantage that fluorescence and phosphorescence occur in the visible spectral range, or close to the visible spectral range, and can therefore be easily detected using optical sensors.

In accordance with a further advantageous embodiment of the invention, the device is furnished with at least one first sensor for capturing the light reflected from the object and with at least one second sensor for capturing the light emitted from the object by fluorescence and/or phosphorescence. The first and the second sensor are located in different positions. Preferably the illumination device, in particular the light-emitting diode (LED), is disposed with its optical axis at an angle different from 0° and 90° counter to the direction of transport of the transport device. The first sensor for capturing the light reflected from the object is disposed with its optical axis at the same angle to the surface of the object as the illumination device, but symmetrical to a plane that runs perpendicular to the surface of the object and through the intersection of the optical axis of the illumination device and the surface of the object. The fact that in reflection the angle of incidence and the angle of reflection of the light are identical is exploited. The second sensor can be located in any position, for example, vertically above the surface of the object. This means that its optical axis is aligned perpendicular to the surface of the object. Since the wave length of the reflected light is different from that of the emitted light, different sensors are employed. The wave length of the reflected light coincides with the wave length of the light from the illumination device. The wave length of the emitted light is shorter than that of the light from the illumination device.

In accordance with a further advantageous embodiment of the invention, the second sensor involves an RGB sensor. RGB is an abbreviation for red, green, blue. This sensor is based on the three-color theory in which all color space is made up by superposing the colors red, green and blue. A separate sensor element is employed for each of the three primary colors.

In accordance with a further advantageous embodiment of the invention, an optical shield is positioned between the illumination device and the second sensor. Said shield prevents the light of the illumination device from compromising the second sensor. In addition, a filter can be positioned at the illumination device that filters out the typical wave lengths of fluorescence and phosphorescence from the light of the illumination device.

In accordance with a further advantageous embodiment of the invention, the power supply for the illumination device is furnished with at least two input resistors connected in parallel and a differential amplifier. The power supply further has a voltage source that provides at least two pulsed input voltages. The number of the pulsed input voltages corresponds to the number of voltage pulses per period of the power supply. With two input voltages, the frequency of the one input voltage is twice as high as the frequency of the second input voltage. With a number n of input voltages, the highest frequency is n times that of the lowest frequency. The maximum number of input voltages can be the same or different. The phase shift between the input voltages is 0. As a result of this particularly simple circuitry using inexpensive components, a periodic current having at least two different current pulses per period is generated.

The sensors convert the reflected or emitted light from the object into an electrical signal proportional to the intensity of the light. Said sensors may be photodiodes or CCDs (charge-coupled devices), for example. Several such components may be arranged in one line or in an array. The sensor is further furnished with an optical system, in particular a lens system. The sensor can furthermore have a filter to mask those wave lengths of the light that are to be detected with the other sensor in question. For example, the second sensor for detecting light based on fluorescence and phosphorescence may be furnished with a filter that absorbs the light in the wave length range of the illumination device.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION OF THE PREFERRED EMBODIMENTS

Example embodiments will now be described more fully with reference to the accompanying drawings.

Figure 1:
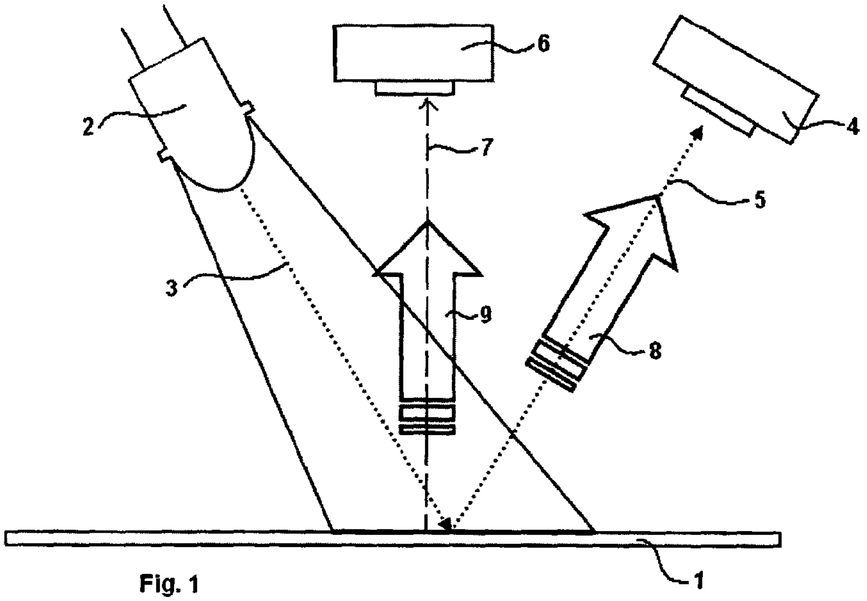
FIG. 1 shows the structural principle of the device.
Figure 2:
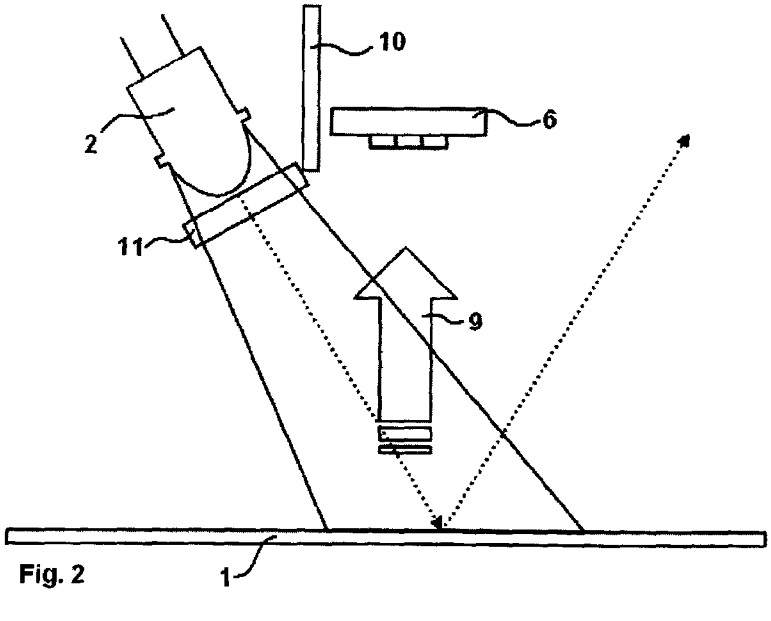
FIG. 2 shows the device from FIG. 1 with additional optical shield and a filter.

FIGS. 1 and 2 show the structural principle of a device for detecting reflected and emitted light from an object 1. The object in question is a bank note. The object 1 is irradiated with light that an illumination device 2 produces. The illumination device in question is a UV LED. The optical axis of the illumination device 2 is shown by an arrow 3. The light reflected from the surface of the object 1 is detected by a first sensor 4. The optical axis of the first sensor 4 is identified by the arrow 5. The object 1 irradiated with the light from the illumination device 2 further emits light because of fluorescence and phosphorescence the wave length of which differs from the incident light from the illumination device. A second sensor 6 is positioned above the object 1 to detect this emitted light. The optical axis 7 of this second sensor 6 runs perpendicular to the surface of the object 1. The reflected light detected by the first sensor 4 is symbolized in FIG. 1 by an arrow 8. The light emitted by fluorescence and phosphorescence is symbolized in FIG. 1 by the arrow 9.

FIG. 2 shows the same schematic structure as FIG. 1. In addition, an optical shield 10 is shown in FIG. 2 between the illumination device 2 and the second sensor 6 as well as a filter 11 in front of the illumination device 2. The filter in question is a UV bandpass filter that filters out the visible components of the light from the illumination device, in particular blue components. The second filter 6 is an RGB sensor. The optical shield 10 in the form of a partition ensures that the UV radiation reflected directly from the object 1 does not reach the second sensor.

Figure 3:
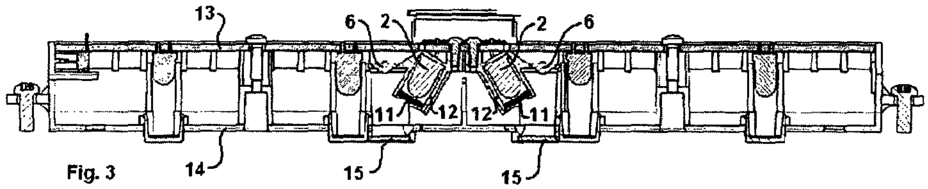
FIG. 3 shows a lengthwise section through a device with the structural principle from FIG. 1.
Figure 4:
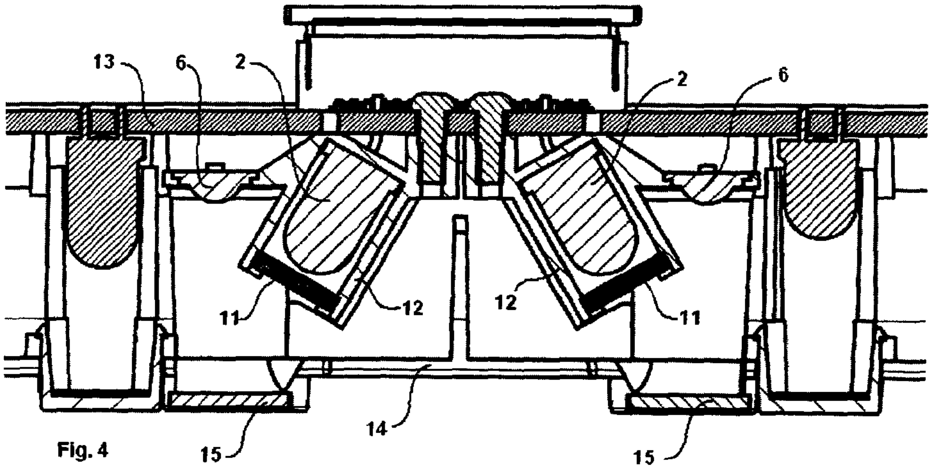
FIG. 4 shows a detail from FIG. 3.

FIG. 3 shows a complete device that is constructed in accordance with the principle from FIGS. 1 and 2. The device consists of two illumination devices 2, two first sensors not visible in the drawing and two second sensors 6. Both illumination devices 2 are furnished with UV LEDs and a filter 11. They are located in a housing 12 that simultaneously acts as an optical shield for the two second sensors 6. The illumination devices 2 and the second sensors 6 are disposed on a printed circuit board 13 that is furnished with additional electrical components. The printed circuit board and the components located thereon are enclosed by a housing 14. To permit the light from the illumination devices 2 and the light emitted by an object to pass to the second sensors 6, the housing 14 is equipped with protective glass 15 permeable to this light. The detail of the device from FIG. 3 with the two illumination devices 2 and the second sensors 6 is shown enlarged in FIG. 4.

Figure 5:
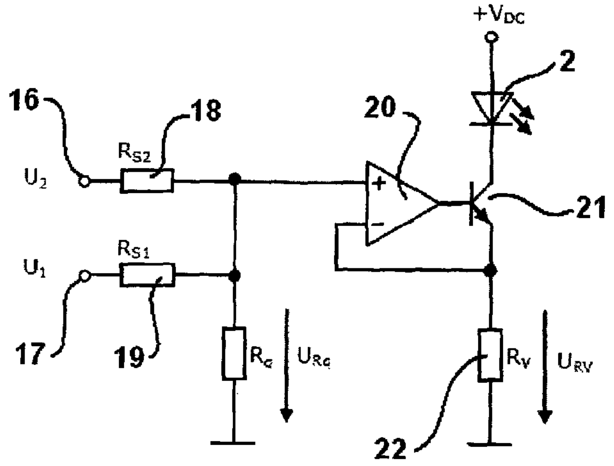
FIG. 5 shows a circuit diagram for the device from FIGS. 1 to 4.

FIG. 5 shows a circuit diagram of the power supply of the illumination device for the device from FIGS. 1 to 4. Input resistors 18 and 19 for a differential amplifier are provided at the inputs 16 and 17 of the circuit. The two input resistors are connected in parallel. The input voltages U1 and U2 are generated by a digital module not shown, for example a microcontroller, an FPGA (Field Programmable Gate Array) or a CPLD (complex programmable logic device). The differential amplifier determines the base current of a transistor 21 that is connected to the UV LED of the illumination device 2. Current through the diode is restricted by a resistor 22.

Figure 6:
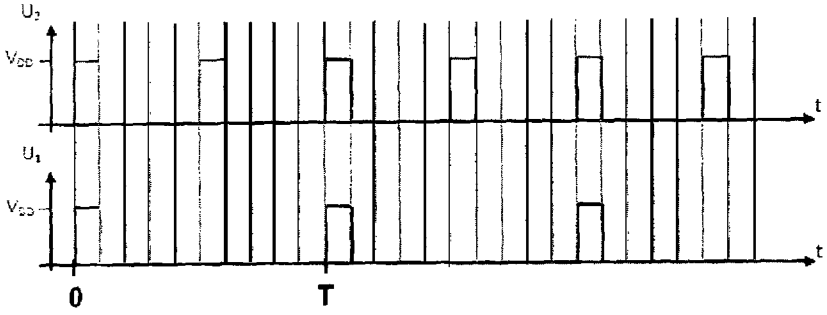
FIG. 6 shows progression over time of the input voltages for the circuit diagram from FIG. 5
Figure 7:
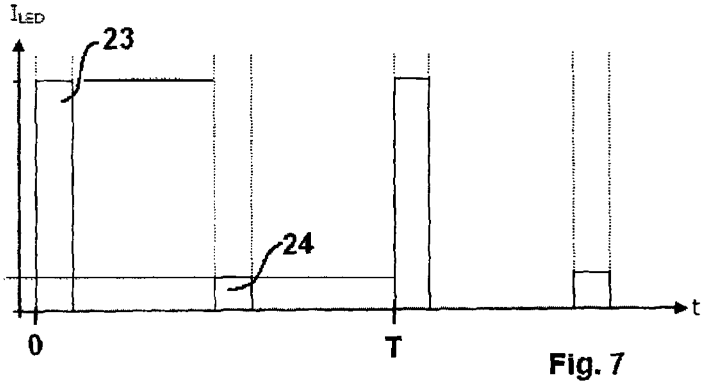
FIG. 7 shows progression over time of current strength at the UV LED resulting from the two input voltages.

A schematic of the progression over time of the two input voltages U1 and U2 is shown in FIG. 6. The frequency of input voltage U1 is twice as high as that of input voltage U2. The phase shift is 0. FIG. 7 shows the progression over time of current ILED for the light-emitting diode (LED) of the illumination device resulting from these input voltages for the circuit from FIG. 5. Two current pulses 23 and 24 are generated within a time period T. The current pulse 23 has greater current strength than current pulse 24. The duty cycle is 1/5. The strength of the current pulses and the duty cycle depend on input voltages U1 and U2 and the input resistors 18 and 19.

All the features of the invention may be essential to the invention both individually and in any combination with each other.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A device for inspecting an object, said device comprising: at least one illumination device that illuminates the object with pulsed light, a transport device that transports the object relative to the illumination device, a power supply for the illumination device that provides the illumination device with a current that is a periodic function over time, wherein a period comprises at least two current pulses with different magnitudes, at least one first sensor for capturing light reflected from the object, and at least one second sensor for capturing light emitted from the object through fluorescence or phosphorescence, the first sensor and the second sensor being located at different positions, at least one of the first or second sensors has a saturation limit: and wherein outputs from the first and second sensors are configured to recognize, inspect, verify and test whether the object is genuine; and wherein an output from a sensor when sensing light from the smaller magnitude pulse is used when the saturation limit for the sensor is reached when sensing light from the larger magnitude pulse.

2. The device according to claim 1, wherein the illumination device has at least one light-emitting diode.

3. The device according to claim 2, wherein the light-emitting diode is a UV light-emitting diode.

4. The device according to claim 1, wherein the second sensor is aligned with its optical axis at an angle of 90° counter to the transport direction of the transport device and wherein the first sensor is aligned with its optical axis at an angle of less than 90° and more than 0°.

5. The device according to claim 1, wherein the second sensor is an RGB sensor.

6. The device according to claim 1, wherein an optical shield is positioned between the illumination device and the second sensor.

7. The device according to claim 1, wherein the power supply to generate the periodic current over time having at least two current pulses per period of different strengths has at least two input resistors connected in parallel and a differential amplifier.

8. The device according to claim 1, wherein the object is a flat bank note.

9. A method for inspecting an object comprising:

transporting the object past at least one illumination device and a first sensor using a transport device, providing the illumination device with a current that is a periodic function over time, wherein a period comprises at least two current pulses of different magnitudes, illuminating the object with the pulsed light from the illumination device, wherein light reflected from the surface of the object is detected by a first sensor, wherein light emitted from the object through fluorescence or phosphorescence is detected by a second sensor, wherein at least one of the first or second sensors has a saturation limit;

using outputs from the first and second sensors to recognize, inspect, verify and test whether the object is genuine; and wherein an output from a sensor when sensing light from the smaller magnitude pulse is used when the saturation limit for the sensor is reached when sensing light from the larger magnitude pulse.

10. The method of claim 9, wherein pulses of large magnitude are interspersed with pulses of smaller magnitude, and wherein, if a sensor does not generate an acceptable output when detecting a smaller magnitude pulse, then an output from a sensor when detecting a large magnitude pulse is used to detect whether the object is genuine.

* * * * *